United States Patent
Doolittle

(10) Patent No.: US 10,846,914 B2
(45) Date of Patent: Nov. 24, 2020

(54) BACK-FACING PATCH CULLING WITH DISPLACEMENT

(71) Applicant: Sony Interactive Entertainment Inc., Tokyo (JP)

(72) Inventor: John Jeffrey Doolittle, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 144 days.

(21) Appl. No.: 15/868,537

(22) Filed: Jan. 11, 2018

(65) Prior Publication Data
US 2019/0213783 A1 Jul. 11, 2019

(51) Int. Cl.
| A63F 13/52 | (2014.01) |
| G06T 15/00 | (2011.01) |
| G06T 15/40 | (2011.01) |
| G06T 17/20 | (2006.01) |
| G06T 15/80 | (2011.01) |
| G06T 15/04 | (2011.01) |

(52) U.S. Cl.
CPC .............. G06T 15/40 (2013.01); A63F 13/52 (2014.09); G06T 15/005 (2013.01); G06T 15/04 (2013.01); G06T 15/80 (2013.01); G06T 17/20 (2013.01)

(58) Field of Classification Search
CPC ......... A63F 13/52; G06T 15/00; G06T 15/04; G06T 15/40; G06T 15/80
See application file for complete search history.

(56) References Cited

U.S. PATENT DOCUMENTS

| 7,200,532 | B1 * | 4/2007 | Cheng ................... G06T 17/20 345/419 |
| 8,144,147 | B2 * | 3/2012 | Munkberg .............. G06T 17/20 345/423 |
| 9,367,216 | B2 * | 6/2016 | Zalewski .............. G06F 1/1626 |
| 9,754,409 | B2 * | 9/2017 | Soulard ................. G06T 17/205 |
| 2004/0012563 | A1 * | 1/2004 | Papakipos ................ G06T 1/20 345/157 |
| 2004/0227755 | A1 * | 11/2004 | Sfarti ...................... G06T 17/20 345/423 |
| 2011/0080405 | A1 * | 4/2011 | Moreton ................. G06T 17/20 345/423 |
| 2011/0134225 | A1 | 6/2011 | Saint-Pierre et al. |
| 2011/0175911 | A1 * | 7/2011 | Loop ....................... G06T 17/30 345/423 |
| 2011/0248997 | A1 * | 10/2011 | Munkberg .............. G06T 17/20 345/423 |

(Continued)

FOREIGN PATENT DOCUMENTS

EP 1067757 A1 1/2001

OTHER PUBLICATIONS

C. Loop, M. Niebner, C. Eisenacher, "Effective Back-Patch Culling for Hardware Tessellation", Microsoft Research, University of Erlangen-Nuremberg, 2011.

(Continued)

Primary Examiner — James S. McClellan
(74) Attorney, Agent, or Firm — John L. Rogitz

(57) ABSTRACT

Back-facing patches of graphics objects are culled from tessellation using parametric tangent plane techniques extended to account for displacement of a simple mesh when establishing a complex mesh for rendering.

19 Claims, 5 Drawing Sheets

(56) References Cited

U.S. PATENT DOCUMENTS

2013/0083966 A1     4/2013   Furukawa et al.
2016/0307369 A1*   10/2016   Freedman ............... G06T 19/00

OTHER PUBLICATIONS

Jon Hasselgren, Jacob Munkberg, Tomas Akenine-Moller, "Automatic Pre-Tessellation Culling", Lund University and Intel Corporation, ACM Transactions on Graphics, vol. 28, No. 2, Article 19, Publication date: Apr. 2009.
International Search Report and Written Opinion from the counterpart PCT application PCT/US18/61918 dated Apr. 30, 2019.

* cited by examiner

BACK-FACING PATCH CULLING WITH DISPLACEMENT

FIELD

The application relates generally to culling back-facing graphics patches under conditions of displacement from a mesh with lower frequency detail to higher frequency detail.

BACKGROUND

When rendering graphics objects in, for example, computer games, the objects are rendered according to models provided by a graphics artist. To promote better performance, memory usage, and flexibility during rendering, the artist may provide a simple model of the object along with a scalar displacement data structure (or "texture") that indicates displacement in the direction of the surface normal for various parts of the object in the simple model to arrive at a final, more complex model of the object. By "scalar" is meant a single value for the displacement, which implicitly means the amount to displace in the direction of the surface normal, as opposed to vector displacement, where the direction and magnitude of the displacement is encoded in a 3D vector.

Prior to displacement, the surface of the simple model is filled in or "tessellated" typically with small triangles, and then displacement is applied to the simple model to arrive at the complex, final model of the object envisioned by the artist.

Some portions ("patches") of objects, are seen from the emulated vantage point (or "camera position") of the graphics while other patches are hidden from view. In particular, in the case of closed objects the patches that are on the side of the mesh facing the camera position will occlude those patches facing away from the camera position. In this context, patches that are seen are referred to as front-facing while patches that are not seen are referred to as back-facing. More generally, the facing of a patch refers to whether or not the normal is in the same direction as the view vector to the camera. Note that a winding order typically is also specified, either clockwise or counter-clockwise, which determines how the cross product is done for determining the side of the normal that counts as front-facing.

Recognizing that tessellating back-facing patches is needless, to save processing time, techniques have been provided for culling back-facing patches from tessellation. Doing so is particularly advantageous when rendering with hardware tessellation, because any patch could potentially generate a significant amount of domain shader work if the tessellation factors are high.

Two techniques to cull back-facing patches before tessellating are a cone of normals and a parametric tangent plane (PTP).

SUMMARY

As understood herein, PTPs typically result in more patch culling than using a cone of normals. The PTP is used to indicate which patches of an object are back-facing (for culling) and which are front-facing (and thus not to be culled from tessellation). The PTP technique is described by Loop et al. in "Effective Back-Patch Culling for Hardware Tessellation", *Vision, Modeling, and Visualization* (2011), which is disclosed in the present file history and is incorporated herein by reference.

As further understood herein, when displacement is applied to the simple model, back-facing patches in the simple model culled from tessellation by the PTP may in fact contain some front-facing portions after the application of displacement because the bounds of a patch change when it displaced. What this means is that a noticeable gap or hole in the final rendered object may appear owing to what has become over-culling once displacement is applied. Present principles accordingly extend the PTP technique to work with displacement without culling patches that may contain front-facing portions after displacement, which still advantageously providing a higher cull rate compared to other techniques, without a significant run-time cost.

Accordingly, a device includes at least one compute circuit configured to receive data input and generate output. The circuit is configured to receive data from at least one displacement map prior to tessellating graphics object patches with which the displacement map is associated. The circuit is configured to, for at least a first patch of the graphics object patches, calculate four normals of the patch, one at each patch corner control point, using a cross product between the respective corner control point and control points of the patch that are nearest to the respective corner control point. Using each normal, the control points of the patch that are nearest the respective corner control point are displaced according to data from the displacement map to create two new patches, one bounding the positive displacement extent and one bounding the negative displacement extent. The circuit is configured to determine whether any coefficient of either new patch's parametric tangent plane is front-facing, and responsive to determining that a coefficient in either new patch is front-facing, tessellate the first patch. On the other hand, responsive to determining that no coefficient in either new patch is front-facing, the first patch is culled from tessellation.

In examples, the compute circuit determines whether to tessellate plural patches of the graphics object for each of plural frames of a graphics program.

In examples, the computer circuit is established at least in part by a compute shader. The compute shader may be implemented to run on a graphics card, e.g., a graphics card of a computer game console.

In implementations, the corner control points are not displaced, and only control points that are nearest to a respective corner control point are displaced.

In another aspect, a computer game console includes at least one graphics card associated with at least one graphics processing unit (GPU). The GPU is configured to execute a process that includes receiving plural portions of a graphics object, and for each portion, applying first displacement information to some but not all control points of the portion to calculate a first displacement extent. The process executed by the GPU also includes, for each portion, applying second displacement information to some but not all control points of the portion to calculate a second displacement extent. The process includes applying shading to the portion responsive to determining that a PTP of at least one of the displacement extents is front-facing, and not applying shading to the portion responsive to determining that PTPs of both displacement extents are not front-facing.

In another aspect, a method includes receiving displacement information, and culling from tessellation back-facing patches of graphics objects using PTP techniques extended to account for the displacement information.

The details of the present application, both as to its structure and operation, can best be understood in reference

DETAILED DESCRIPTION

Figure 1:
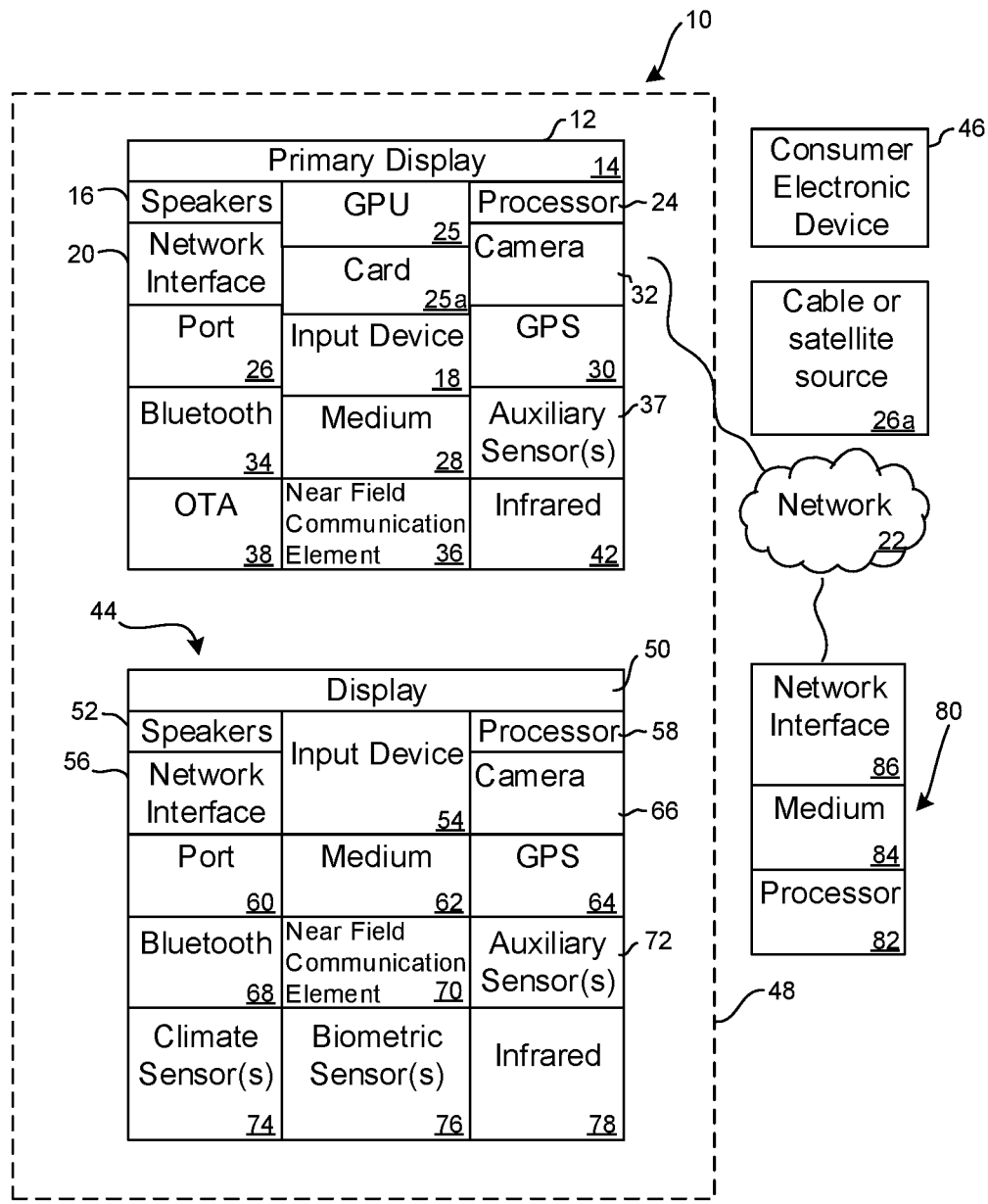
FIG. 1 is a block diagram of an example system including an example in accordance with present principles.

This disclosure relates generally to computer ecosystems including aspects of consumer electronics (CE) device networks such as but not limited to distributed computer game networks, video broadcasting, content delivery networks, virtual machines, and machine learning applications.

A system herein may include server and client components, connected over a network such that data may be exchanged between the client and server components. The client components may include one or more computing devices including game consoles such as Sony PlayStation® and related motherboards, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a sharable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, e.g., a wireless telephony transceiver, or Wi-Fi transceiver as mentioned above, etc.

It is to be understood that the one or more processors control the AVD 12 to undertake present principles, including the other elements of the AVD 12 described herein such as e.g. controlling the display 14 to present images thereon and receiving input therefrom. The one or more processors may include a central processing unit (CPU) 24 as well as a graphics processing unit (GPU) 25 on a graphics card 25A. A GPU may be associated with a compute shader implemented in software using, for example, DirectX 11 style High Level Shading Language.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast™, Roku®. A CE device may be established by a digital assistant, an example of which is shown and described further below.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a digital assistant, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cell phone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., network gaming applications, digital assistant applications, etc. Or, the server 80 may be implemented by one or more game consoles or other computers in the same room as the other devices shown in FIG. 1 or nearby.

Figure 2:
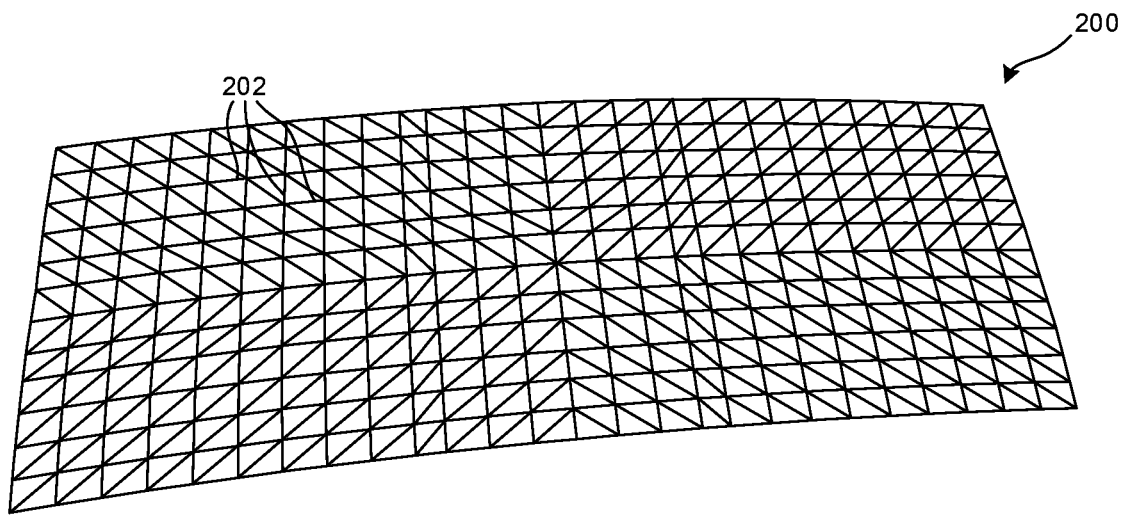
FIG. 2 is a schematic view of a bi-cubic Bezier patch after tessellation.

Prior to turning to FIG. 2 et seq., a "patch" (essentially, a portion of an object model to be rendered) can be classified as back-facing if no part of the patch's parametric tangent plane is front-facing. Thus, a parametric tangent plane (PTP) technique may be used to determine whether a patch is front-facing or back-facing. Rather than directly evaluating the tangent plane, this test can be done efficiently on, e.g., the GPU 25 in FIG. 1 by checking if any coefficient of the tangent plane is front-facing. The coefficients of the parametric tangent plane are calculated by performing a weighted sum of the patch's control points. This technique is described in the paper referenced above and advantageously has a high cull-rate, and can be optimized to be fast.

With the above in mind, refer now to FIG. 2, which shows a standard bi-cubic Bezier front-facing patch 200 after tessellation (indicated by the triangles 202). The patch 200 typically is a patch of a simple model provided by an artist, who also may provide a displacement "texture" that defines how to alter the simple model (typically after tessellation) to produce a complex model of the object for rendering.

Figure 3:
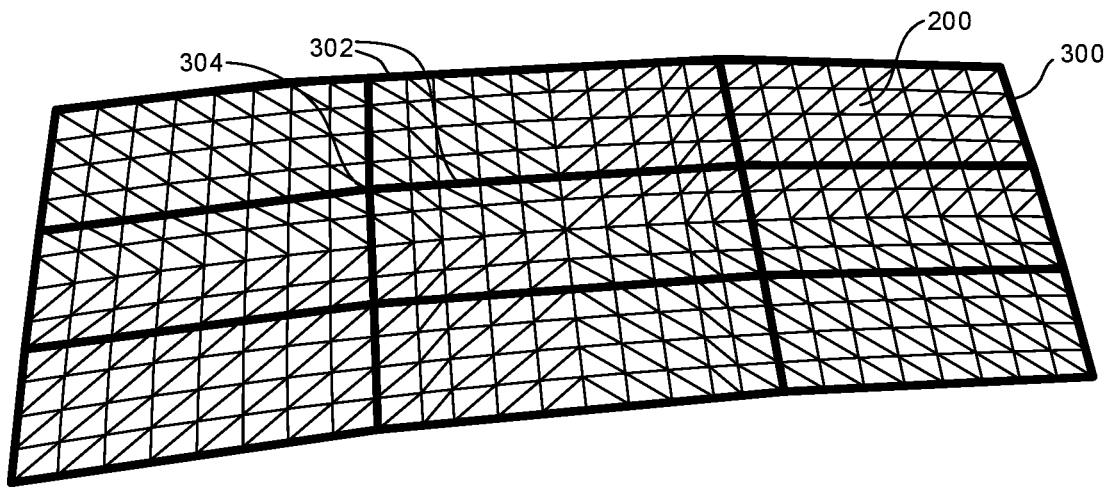
FIG. 3 is a schematic view of the patch shown in FIG. 2 showing the control cage in thick lines.

In FIG. 3, a control cage 300 is shown schematically overlaid onto the patch 200. The control cage 300 is represented by relatively thick lines 302 and influences the shape of the tessellated surface. The intersections 304 of control cage lines 302 define the control points of the patch 200. In the example shown, sixteen (16) control points 304 are defined. These control points are the input to the parametric tangent plane calculation as more fully described below. In an example non-limiting implementation, the patches are described by subdividing the simple version of a mesh produced by an artist and extracting the patches from the limit surface of the subdivision. The extraction is possible because the limit surface can be interpreted as a set of bi-cubic B-Spline patches, which can be rendered directly or converted to other forms such as Bezier. The control cage may also be defined manually.

Figure 4:
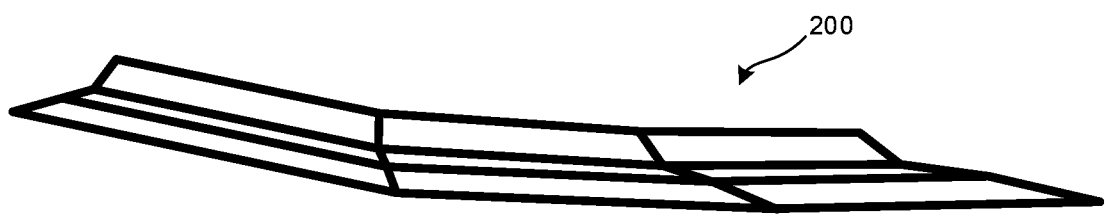
FIG. 4 is a schematic view of the patch in FIG. 2 rotated to be back-facing and hence not tessellated as having been culled by the PTP technique.

For illustration purposes, FIG. 4 shows the patch 200 rotated to be back-facing. Note that the tessellated part is not drawn because the patch was able to be culled by checking the coefficients of the parametric tangent plane, which indicate that the patch is back-facing and hence culled from tessellation.

Figure 5:
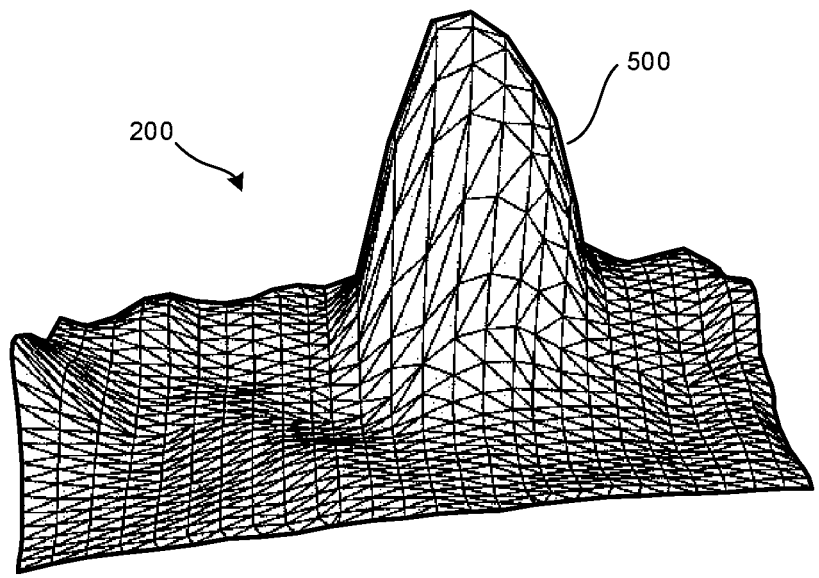
FIG. 5 is a schematic view of the patch of FIG. 2 with displacement applied.

To facilitate understanding of how present principles extend the PTP culling technique to work with displacement, FIG. 5 illustrates the patch 200 with an example displacement applied to it. In the example shown, the displacement includes a portion 500 that extends relatively far outside the bounds of the original control cage 300 shown in FIG. 3, and thus it cannot be accounted for when doing the parametric tangent plane calculation (since the only input to the calculation is the original control points).

Figure 6:
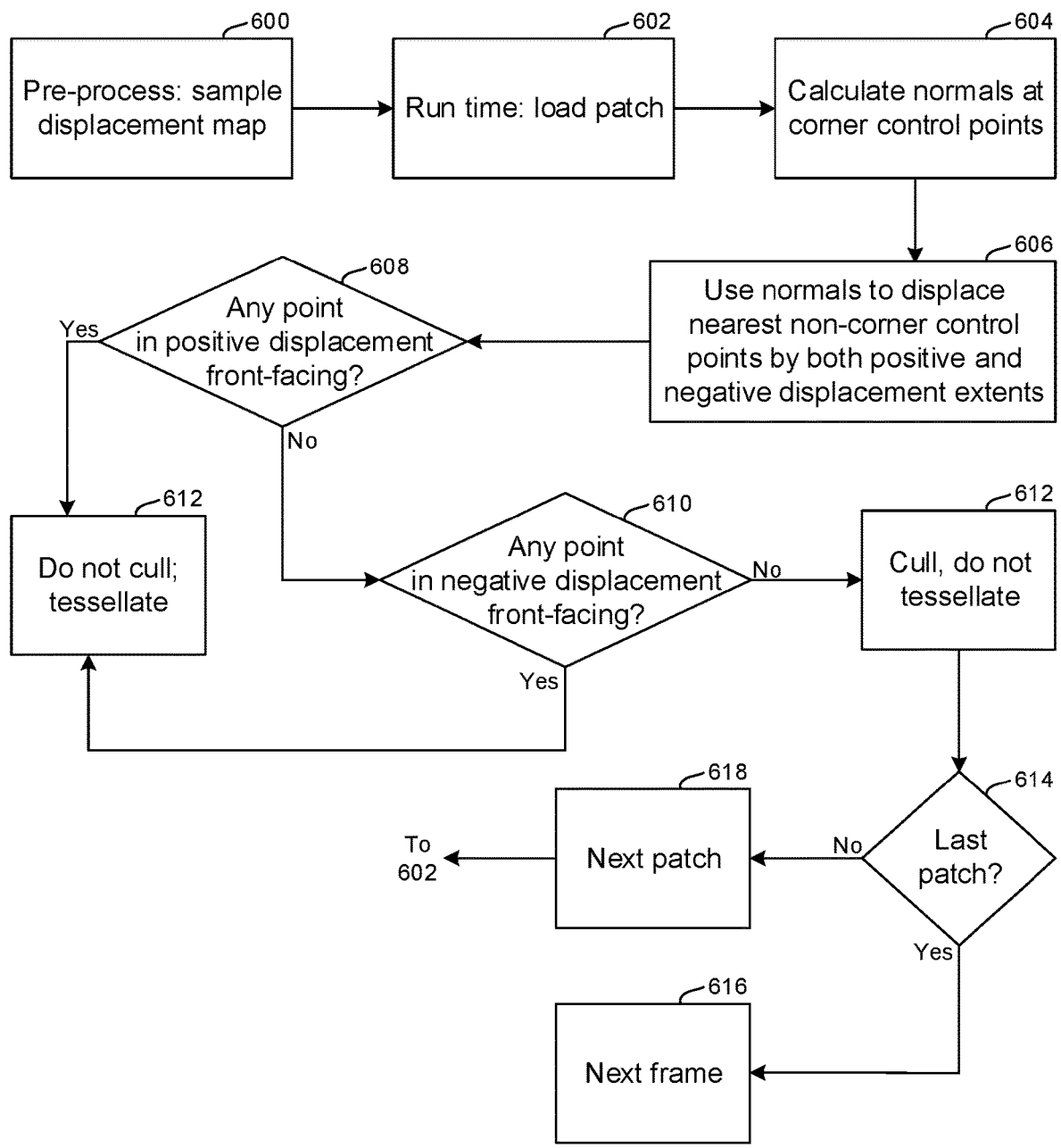
FIG. 6 is a flow chart of example logic according to present principles.

FIG. 6 illustrates example logic to account for the displacement. Commencing at block 600, the desired displacement map (typically provided by the artist who created the model) can be sampled in a pre-process to determine the extents of displacement per patch. This is to establish tight bounds when culling, because if the displacement is not known per patch then the cull rate may be very poor. Note that positive and negative displacements for each patch are obtained, in the example shown, by finding the largest displacement on the patch in the direction of the normal and the largest displacement on the patch in the direction opposite the normal, respectively for creating the new patches to bound the displacement extents.

At run-time, e.g., during rendering of a graphics program such as a computer game by a computer game console such as any of those described herein, each patch to be rendered is loaded at block 602 into, e.g., a compute shader prior to drawing. As mentioned previously, the compute shader may be implemented on a graphics card 25A.

At block 604, four normals of the patch are calculated, for example by the compute shader. In an implementation, the four normals are calculated for each of the four corner control points. In one example, this may be executed by a simple cross product between the corner control point vector and the corner's immediate neighboring control point vectors.

Figure 7:
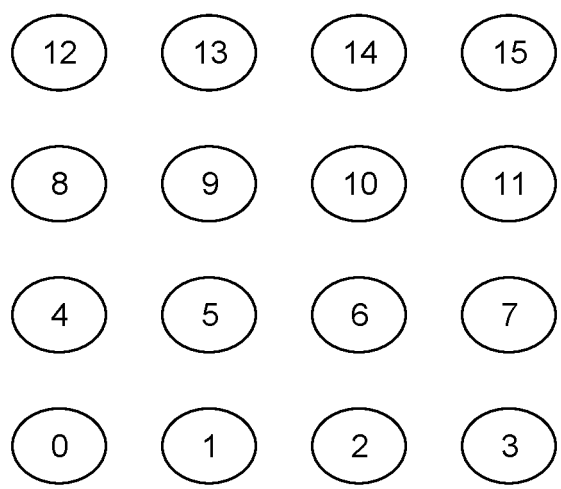
FIG. 7 schematically shows the control points numbered for ease of description.

FIG. 7 illustrates. Assume the original cage 300 shown in FIG. 3 is used, in which sixteen control points are defined. For illustration, FIG. 7 numbers these control points as shown. The control points numbered 0, 3, 12, and 15 are the corner control points. The normal at corner 0 is calculated using the cross-products of control points 0, 1, and 4. The normals for points 3, 12, and 15 are similarly calculated using, respectively, the cross-products associated with the points 2, 3, 7 (for control point 3), 11, 14, 15 (for control point 15), and 8, 12, and 13 (for control point 12).

Once the control point normals are determined, the logic of FIG. 6 moves to block 606 in which the corner control point normals are used to displace their respective nearest non-corner control points by the displacement extents identified at block 600. The nearest non-corner control points are displaced twice (in both the positive and then negative directions) to create two new patches that form a convex hull around the original patch 200. As stated above, the largest displacement on the patch in the direction of the normal and the largest displacement on the patch in the direction opposite the normal may be used at block 606.

Thus, for the corner control point 0, the corner control point 0 is left as-is, and points 4, 5, and 1 (the nearest neighbor control points to the corner control point 0) are displaced by the extents in the direction of the normal at the corner control point 0. Similarly, the corner control point 3 is left as-is, and points 2, 6, and 7 (the nearest neighbor control points to the corner control point 3) are displaced by the extents in the direction of the normal at the corner control point 3, the corner control point 15 is left as-is, and points 10, 11, and 14 (the nearest neighbor control points to the corner control point 15) are displaced by the extents in the direction of the normal at the corner control point 15, and the corner control point 12 is left as-is, and points 8, 9, and 13 (the nearest neighbor control points to the corner control point 12) are displaced by the extents in the direction of the normal at the corner control point 12.

Thus, the corner control points remain "anchored" as they were prior to displacement, and only the closest interior control points to the respective corner control points are displaced.

Figure 8:
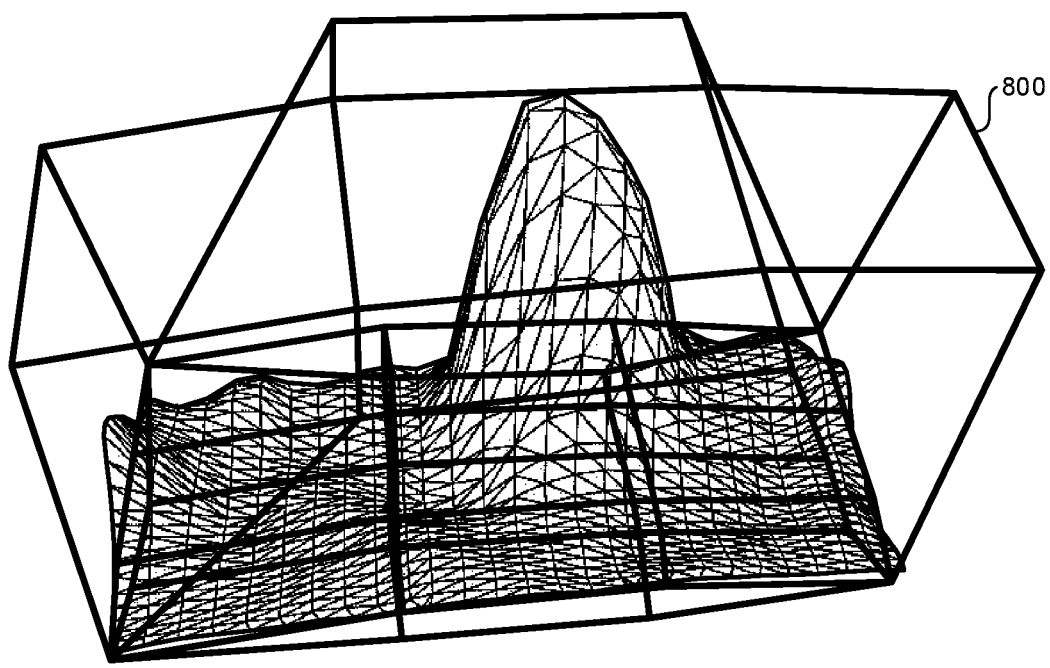
FIG. 8 shows the positive displacement and negative displacement extents from the orientation of the patch as shown in FIG. 2.
Figure 9:
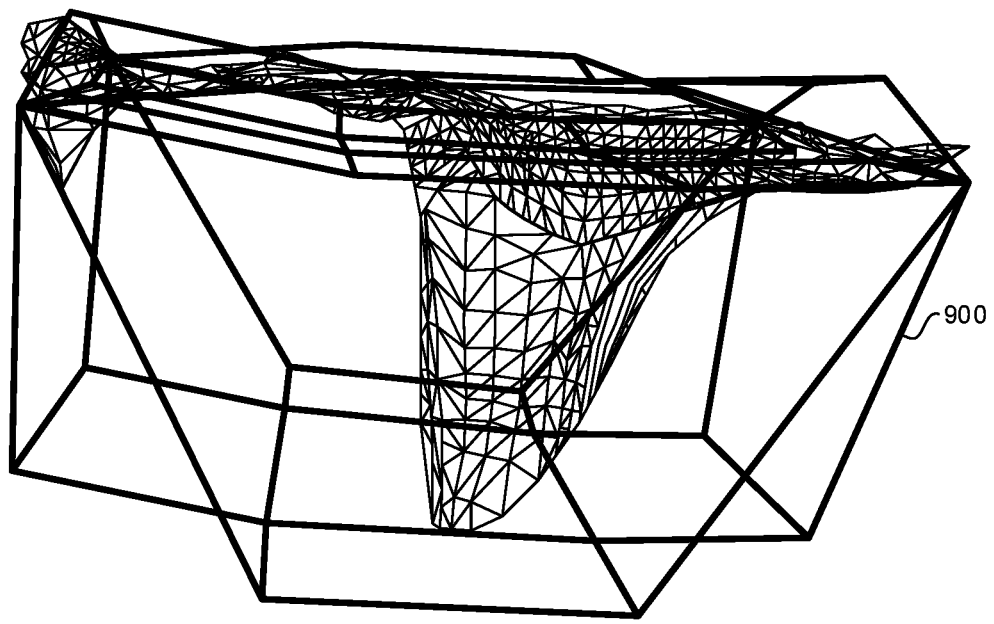
FIG. 9 shows the positive and negative displacement extents from the orientation of FIG. 4, where the extended PTP technique no longer culls the patch.

FIGS. 8 and 9 show the result of displacing the control points in both the positive and negative extents, from two different orientations, to render a cage depiction 800 from a first orientation and a cage depiction 900 from a second orientation for illustration. Note that the positive extent is the large cage that extends up around the bump. The negative extent is much smaller in the example patch shown but can be seen going slightly below the patch plane in FIG. 8. In FIG. 9 the positive extent is still the side with the large bump because it is positive or negative relative to the surface normal. The negative extent may be more clearly seen in FIG. 9 which illustrates the patch being displaced opposite the normal slightly. In any case, FIG. 9 illustrates that when the patch is rotated, it is no longer erroneously culled.

Returning to FIG. 6, rather than checking the original cage 200 using PTP, culling with displacement can be done by checking against both of the new cages shown in FIGS. 8 and 9. Note that for discussion purposes, "cages" are referred to here to emphasize that the new patches are defined by the control points of the new cages in the diagrams. The patch that is tessellated in those figures is still the original patch. The diagram does not show the tessellation of the new patches because the new patches are only used as an intermediate in calculating the culling and are never actually drawn as a surface.

More specifically, proceeding to decision diamond 608, PTP is implemented on a first displacement to determine whether any coefficient of the PTP of the positive displacement patch indicates front-facing. If no coefficient in checking the positive displacement indicates front-facing, the logic may move to decision diamond 610 to determine whether any coefficient of the PTP implemented on the negative displacement patch indicates front-facing. If no coefficient in the negative displacement indicates front-facing, the logic can move to block 612 to cull the patch from tessellation. On the other hand, if any coefficient of any control point of either displacement indicates front-facing, the patch is not culled at block 612 and thus is tessellated. If all patches of the frame are processed as determined at decision diamond 614, the next frame is processed as indicated at block 616; otherwise, the next patch in the frame is accessed at block 618 and the process loops back to block 602 to load the next patch.

Thus, the process at run time, in an example, may be executed by a compute shader on a game console such as a PlayStation®. At the start of each frame, each patch is checked for culling. This allows the compute shader to dynamically cull as the camera moves around a scene or a mesh moves within a scene. Only the patches that pass the culling are sent to be drawn at block 612.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein

What is claimed is:

1. A device comprising:
   at least one compute circuit configured to receive data input and generate output, the circuit being configured to:
   receive data from at least one displacement map prior to tessellating graphics object patches with which the displacement map is associated;
   for at least a first patch of the graphics object patches:
   calculate four normals of the patch, one at each patch corner control point, using a cross product between the respective corner control point and control points of the patch that are nearest to the respective corner control point;
   using each normal, displace the control points of the patch that are nearest the respective corner control point according to data from the displacement map to create two new patches, one being positive displacement and one being negative displacement;
   determine whether any coefficient of either new patch's parametric tangent plane is front-facing;
   responsive to determining that a coefficient in either new patch is front-facing, tessellate the first patch; and
   responsive to determining that no coefficient in either new patch is front-facing, not tessellate the first patch.

2. The device of claim 1, wherein the compute circuit determines whether to tessellate plural patches of the graphics object for each of plural frames of a graphics program.

3. The device of claim 1, wherein the computer circuit is established at least in part by a compute shader.

4. The device of claim 3, wherein the compute shader is implemented by a graphics card.

5. The device of claim 4, comprising a computer game console containing the graphics card.

6. The device of claim 1, wherein the corner control points are not displaced, and only control points that are nearest to a respective corner control point are displaced.

7. A computer game console, comprising:
   at least one processor configured with instructions for:
   receiving plural portions of a graphics object;
   for each portion, applying first displacement information to some but not all control points of the portion to calculate a first displacement extent;
   for each portion, applying second displacement information to some but not all control points of the portion to calculate a second displacement extent;
   applying shading to the portion responsive to determining that a parametric tangent plane (PTP) of at least one of the displacement extents is front-facing; and
   not applying shading to the portion responsive to determining that PTPs of both displacement extents are not front-facing.

8. The computer game console of claim 7, wherein the instructions are executed by executing a compute shader.

9. The computer game console of claim 7, wherein the portions are patches.

10. The computer game console of claim 7, wherein the first displacement information is positive, and the second displacement information is negative.

11. The computer game console of claim 9, wherein the process comprises:
    for at least a first patch:
    calculating four normals of the first patch, one at each patch corner control point, using a cross product between the respective corner control point and control points of the patch that are nearest to the respective corner control point;
    using each normal, displacing the control points of the patch that are nearest the respective corner control point according to the first displacement information; and
    using each normal, displacing the control points of the patch that are nearest the respective corner control point according to the second displacement information.

12. The computer game console of claim 7, wherein determining that a PTP of at least one of the displacement extents is front-facing comprises determining whether any coefficient of at least one of the displacement extents indicates front-facing.

13. The computer game console of claim 7, wherein corner control points of each portion are not displaced, and only control points that are nearest to a respective corner control point are displaced.

14. A computer-implemented method, comprising:
    receiving displacement information; and
    culling from tessellation back-facing patches of graphics objects using parametric tangent plane (PTP) techniques extended to account for the displacement information, culling comprising at least in part:
    for at least a first patch, for each of plural normals calculated at respective corner control points of the first patch, using each normal, displace control points of the patch that are nearest the respective corner control point according to displacement data to create two new patches, one being a positive displacement and one being a negative displacement.

15. The computer-implemented method of claim 14, comprising receiving the displacement information prior to run time for rendering the graphics object.

16. The computer-implemented method of claim 14, wherein culling from tessellation comprises:
   for at least the first patch of the graphics object patches:
   calculating four normals of the patch, one at each patch corner control point.

17. The computer-implemented method of claim 16, wherein calculating four normals is executed using a cross product between the respective corner control point and control points of the patch that are nearest to the respective corner control point.

18. The computer-implemented method of claim 14, comprising:
   determining whether any coefficient of either new patch's parametric tangent plane is front-facing.

19. The computer-implemented method of claim 18, comprising:
   responsive to determining that a coefficient in either new patch is front-facing, tessellating the first patch; and
   responsive to determining that no coefficient in either new patch is front-facing, not tessellating the first patch.

* * * * *